United States Patent
Lodge et al.

[11] Patent Number: 5,188,859
[45] Date of Patent: Feb. 23, 1993

[54] LOW FAT SNACK

[75] Inventors: Richard W. Lodge; Charles H. Allen, both of Cincinnati, Ohio

[73] Assignee: The Procter & Gamble Company, Cincinnati, Ohio

[21] Appl. No.: 603,580

[22] Filed: Oct. 25, 1990

[51] Int. Cl.$^5$ .......................... A23L 1/10; A23L 1/217
[52] U.S. Cl. .................................. 426/560; 426/439; 426/510; 426/637; 426/808
[58] Field of Search ................ 99/450, 439, 432, 426; 249/144, 141, 113, 389; 426/560, 637, 510, 808, 441, 439, 438

[56] References Cited

U.S. PATENT DOCUMENTS

| Re. 27,531 | 12/1972 | Murray et al. | 99/100 |
|---|---|---|---|
| 3,402,049 | 9/1968 | Mancuso et al. | 99/100 |
| 3,998,975 | 12/1976 | Liepa | 426/560 |
| 4,058,631 | 11/1977 | Roan | 426/52 |
| 4,283,425 | 8/1981 | Yuan et al. | 426/102 |
| 4,510,165 | 4/1985 | Caridis et al. | 426/510 |
| 4,511,583 | 4/1985 | Olson et al. | 426/89 |
| 4,530,275 | 7/1985 | Stickle et al. | 99/439 |
| 4,535,688 | 8/1985 | Bentson | 99/450 |
| 4,537,786 | 8/1985 | Bernard | 426/436 |
| 4,721,625 | 1/1988 | Lee et al. | 426/438 |
| 4,756,916 | 7/1988 | Dreher et al. | 426/302 |
| 4,933,199 | 6/1990 | Neel et al. | 426/438 |

FOREIGN PATENT DOCUMENTS

| 957896 | 11/1974 | Canada | 99/174 |
|---|---|---|---|
| 1151945 | 8/1983 | Canada | 99/174 |

Primary Examiner—Jeanette Hunter
Assistant Examiner—Mary S. Mims
Attorney, Agent, or Firm—Rose Ann Dabek; K. L. Stewart; Jerry J. Yetter

[57] ABSTRACT

A process for preparing low fat shaped snack products having a light, crispy, crunchy texture is disclosed. A dough is formed from 50% to 80% flour, preferably potato flour, and water (20% to 50%), and formed into a sheet from which snack pieces are cut. The snack pieces are coated with an oil, constrained in a mold and cooked, preferably with hot air or superheated steam, to provide a snack having 10% to 20% fat and having a fried-like texture and flavor.

26 Claims, 3 Drawing Sheets

LOW FAT SNACK

TECHNICAL FIELD

This application relates to an improved snack product which is lower in fat than other fried snacks made from doughs. In particular, this application relates to a process for preparing such products from a farinaceous dough. The dough is sheeted, cut into pieces, coated with oil, and then dehydrated and cooked using superheated steam or other heat source while being held in a mold.

BACKGROUND OF THE INVENTION

A wide variety of farinaceous (starch and protein-based) snack food products are presently available to the consumer. Many of these products are in the form of chips, strips, and extruded pieces. Some of these products are expanded or puffed and contain a cellular or honeycombed internal structure. Most of the present-day snack products contain a fairly high level of fat, either in the form of separately added ingredients, such as cheese, or in the form of fats absorbed by the product during frying, as in the case of corn or potato chips. While fat improves the flavor and palatability of these products, it also increases the caloric value of the product. Accordingly, it would be desirable to provide low fat snack products which have an attractive appearance, texture and taste.

There have been several attempts at lowering the fat content of potato chips and of potato snacks made from doughs. One method involved coating chips with an aqueous dispersion of a high amylose starch. This is said to produce a potato chip with minimal oil pick-up and low variation in the amount of oil absorbed. (see RE 27,531 of U.S. Pat. No. 3,597,227 issued to Muray, et al., 1971). Coating of breaded or batter food products with a film forming agent such as gelatin or starches is also said to lower oil absorption by the foods when they are fried (U.S. Pat. No. 4,511,583 issued to Olson, et al, 1985). An alternative coating of raw starchy foods was described in U.S. Pat. No. 4,058,631 (Roan, 1977) which involves coating the food surface with an aqueous solution of alpha amylase enzyme. This is said to lower the fat absorption of the product during frying.

Other ways to lower the oil content involve removing oil from fried products by steam treatment, coating a potato slice with oil and then finish cooking with microwave or steam or other heat. Frying potato slices until they are partially cooked and then drying them has also been tried. See for example the following patents:

U.S. Pat. No. 4,756,916 to Dreher et al (assigned Frito Lay, 1988) describes a process for making a low fat potato chip wherein washed potato slices are partially coated with oil, blanched at a temperature of 70°-100° C. and then baked to a temperature at least 200° C. When the moisture content of the partially dried slices is reduced to 10-25%, the slices can be further baked at a lower temperature (145°-160° C.) to finish drying the slices to a moisture content of 2 weight percent. The product is said to have the texture, flavoring and color characteristics of a conventional fried chip.

U.S. Pat. No. 3,402,049 to Mancuso et al (assigned General Foods, 1968) describes a process for making potato chips having a total fat content of 20-30% by weight. Raw potato slices are soaked in an edible fat, drained to remove excess fat and then heated to elevated temperatures to surface fry and dehydrate the potato slices.

U.S. Pat. No. 4,283,425 to Yuan et al (General Foods, 1981) describes a potato chip having a fat content of up to 10%. This chip is prepared by coating raw potato slices with a globular protein, applying a layer of edible oil on top of the protein coating, and then subjecting the raw coated slices to microwave heating.

U.S. Pat. No. 4,721,625 to Lee et al (Borden, 1988) describes a process for preparing low fat potato chips in which peeled raw potato chips are fried in oil to a moisture content of 10-25% by weight. The partially fried potato slices are protected against oxidation, and the oil is removed from the surface. The chips are then dried to a moisture content of 1.5-3%. Superheated steam is used to remove the fat from the chips. The superheated steam can be used as a drying agent also.

Canadian Patent 1,151,945 issued to Mehta et al (General Foods, 1983) describes a potato chip having a low fat content which is prepared by microwave heating. Before microwave heating, the raw potato slices are coated with an edible oil sufficient to bring the fat content to 20%.

U.S. Pat. No. 4,537,786 issued to Bernard (Frito Lay, 1985) describes a process for manufacturing a low oil fried potato chip wherein the potato slices are fried in oil to a temperature of about 280°-320° F. (138° C.-160° C.), removed from the oil, and then contacted with an oil removing blast of hot air for from 1-10 minutes. This hot air removes the excess oil as well as finishes cooking the chip.

Canadian Patent 957,896 issued to Hai et al (General Foods, 1974) describes a process for decreasing the fat content of fried chip-type potato products. The fried food product is centrifuged at at least 352 G of force while being contacted with superheated steam or saturated steam. The heat and steam remove the fat and finish cooking the chips.

The above processes apply to whole potato slices and are not easily adapted to products made from doughs. In addition, the heating process herein is accomplished using molds. These molds serve two functions:
1. to hold and shape the product; and
2. to transfer the heat into the product.

It is an object of this invention to make a shaped snack food with a lower fat content (between about 10% to about 25%) which has the texture and flavor of a fried snack by coating a dough piece with oil and then heating the dough piece to remove the moisture and to cook it.

SUMMARY OF THE INVENTION

The present invention relates to an improved lower fat snack product and a process for making it.

This process comprises the steps of:
(a) forming a dough comprising:
(1) from about 50% to about 80% of a starch based flour;
(2) from about 0% to about 5% emulsifier;
(3) from about 20% to about 50% added water;
(b) forming a thin snack piece;
(c) coating said snack pieces with about 10% to about 25% oil; and
(e) cooking said snack pieces in a mold, preferably using superheated steam.

The dough can be formed into a sheet and then cut into snack pieces, or the snack pieces formed, preferably by extrusion.

The snack pieces are cooked at a temperature sufficient to form snack products having a light, crispy, crunchy texture, improved flavor and a fat content of from about 10% to about 25%. This is a lower fat content than most conventional fried snacks. If desired, the lubricity of the snack can be further enhanced by increasing the fat content of the snack to 35% by spraying oil on the snack.

All percentages and proportions are "by weight" unless otherwise specified.

DESCRIPTION OF THE FIGURES

In FIGS. 4 and 5 the fixtures which fasten the molds together and attach the molds to a conveyance are not shown.

In FIG. 1 the top of the mold (1a) contain holes designated by (1c). In FIG. 2, the top (1a) and the bottom half of the mold (1b) constrain a dough piece (2). FIG. 3 is a view of the bottom of the nozzle (3). FIG. 4 is a front view with the nozzle (3) showing the jets of super heated steam (4) impinging on the top of the mold (1a). In FIG. 5 the angle between the centers of each of the rows of jets is 13° and is designated by (5). FIG. 6 is a manifold with three nozzles (3), the mold (1a) containing the chip travels in the direction of the arrows (A) under the steam nozzles (3). The steam supply is designated by B.

DETAILED DESCRIPTION OF THE INVENTION

A. Dough Formulation

Figure 1:
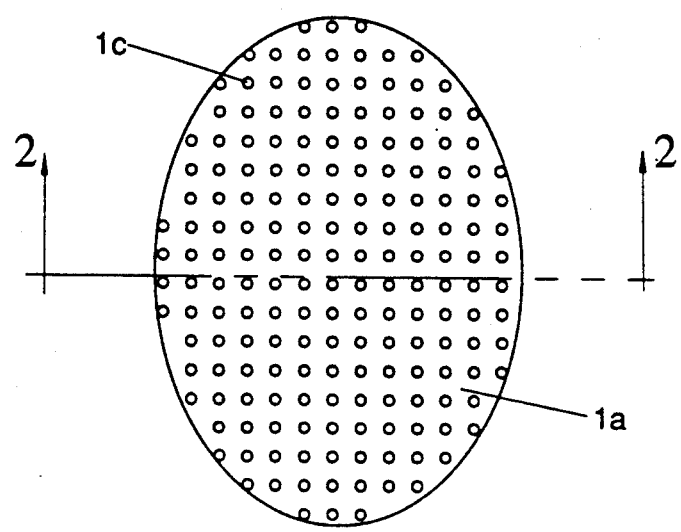
FIG. 1 is a mold for holding the dough during cooking. The mold is perforated.

The dough is prepared from starch based flour and water. Hydrolyzed starches, emulsifiers, and other optional ingredients described hereafter can be added. The composition of the dough controls the ease with which the dough is processed into a sheet or molded pieces and the textural and flavor features of the resulting cooked snack product.

An important component of this dough is a starch based flour. Potato flour is the most preferred flour. Suitable sources of potato flour include dehydrated potato flakes and granules, mashed potato materials, and dried potato products. Other tuber and grain flours such as yellow corn, white corn, popcorn, tapioca, peanut, wheat, oat, rice, and soy meal can be used in the dough. These starch based flours can be blended to make snacks of different composition and flavor.

Suitable starches can be used in combination with the potato flour. Examples of such materials are potato starch, tapioca starch, cornstarch, oat starch, rice starch and wheat starch.

Hydrolyzed starches are also useful for the processability of doughs which have relatively low water levels. The hydrolyzed starches for inclusion in the dough have Dextrose Equivalent (D.E.) values of from about 5 to about 30, preferably from about 10 to about 20. Maltrin ® M050, M100, M150, M180, M200, and M250 (available from Grain Processing Corporation, Iowa) are preferred maltodextrins. The D.E. value is a measure of the reducing equivalence of the hydrolyzed starch referenced to dextrose and expressed as a percent (on a dry basis). The higher the D.E. value, the more reducing sugars are present.

Hydrolyzed starches can be included in an amount of from about 3% to about 15%, and preferably, from about 5% to about 12%.

Another ingredient of the dough is water. As used herein, the term "added" refers to water which has been added to the dry dough ingredients. Water which is inherently present in the dry dough ingredients is not included in the added water. The level of water in flours and starches is usually from about 3% to about 8%. If maltodextrin or corn syrup solids are added as a solution or syrup, the water in this syrup or solution must be accounted for as "added water". The doughs of the present invention can comprise from about 20% to about 50% added water, preferably from 25% to 41% added water. This low level of water in the dough along with the addition of hydrolyzed starches to the doughs provides doughs which can form cohesive sheets and which are easily extruded as thin pieces.

Emulsifiers can be included in the doughs, typically in minor amounts up to about 5% by weight, preferably from about 0.5% to about 3%, and most preferably from about 1.5% to about 2.5%. Emulsifiers are used as a sheeting aid to avoid overworked sticky doughs and to reduce puffing and blistering in the cooked product. Lower moisture doughs, when cooked, typically yield harder snack products. To make products with textures similar to those made from higher moisture doughs, the level of emulsifier is typically reduced.

Preferred emulsifiers are mono- and diglycerides of saturated and unsaturated fatty acids, and in particular mono- and diglycerides of stearic and palmitic acids. Sucrose mono- and diesters of saturated and unsaturated long chain fatty acids can also be used as can other emulsifiers such as polyglycerol esters or polyethoxysorbitan esters.

Salt, flavorings, and/or seasonings can also be optionally included in the dough or sprinkled on the surface of the snack after cooking. Flavors and flavor precursors can also be added to the dough. Reducing sugars, i.e. fructose, glucose and maltose add browned notes to the cooked dough. Sucrose can also be used to provide added flavor as can high fructose corn syrup solids.

The dough can be prepared by any suitable method for combining together the previously described ingredients. Typically, a loose, dry dough is prepared by thoroughly mixing the flour, emulsifier, flavoring (optional) with sufficient added water to obtain the required added water levels. Preferred devices for mixing together these dough ingredients are conventional mixers. Hobart ® mixers are used for batch operations and Turbolizer ® mixers can be used for continuous mixing operations. However, extruders can also be used to mix the dough and to form sheets for cutting or for forming shaped dough pieces.

B. Sheeting and Snack Piece formation

Once prepared, the dough is then formed into a relatively flat, thin sheet or thin snack pieces. By "thin" herein is meant from about 0.015 to about 0.1 inches (0.038 cm to 0.25 cm). Any method suitable for forming sheets from starch based doughs can be used. For example, the sheet can be rolled out between two counter-rotating cylindrical rollers to obtain a uniform, relatively thin sheet of dough material. Any conventional sheeting, milling and gauging equipment can be used.

Doughs of the present invention are usually formed into a sheet having a thickness of from about 0.015 to about 0.10 inches (from about 0.038 to about 0.25 cm), and preferably to a thickness of from about 0.015 to about 0.025 inches (from about 0.038 to about 0.062 cm).

The dough sheet is then cut into snack pieces of a predetermined size and shape using any suitable stamping or cutting equipment. The snack pieces can be cut or formed into a variety of shapes. For example, in the shape of ovals, squares, circles, a bowtie, a star wheel, or a pin wheel.

The dough can be formed into thin snack pieces by extruding through a shaped die. Conventional extruders can be used for this purpose. Twin screen extruders, such as those available from Werner Pfleiderer (Germany), are preferred because the dough moves through more uniformly and doesn't stick to the screw flights. Single screw extruders can also be used. Single screw extruders are available from Wenger in the U.S.

The dough can also be mixed in the extruder. In this case, usually the dry ingredients are added to the hopper and water is added in the extruder barrel. This is also a conventional forming process in snack foods.

C. Coating the Snack Pieces

The snack pieces are coated with oil and then cooked. This can be done in two ways: the sheet is coated with oil and then cut into pieces. Alternatively, the individual pieces can be coated with oil and then cooked. Preferably, the mold is coated with oil, and this oil is then transferred to the snack piece on contact. From about 10% to about 25% oil is used to coat the snack pieces.

Typical coating oils include fats and oils derived from animal and vegetable sources. Any number of unhydrogenated or partially hydrogenated oils, such as soybean, cottonseed, peanut, corn, palm oil, cottonseed oil, canola oil, rapeseed oil, sunflower seed oil, lard, tallow, peanut oil, among others, can be sprayed or otherwise applied onto the snack pieces. Lower molecular weight oils, i.e. those containing short chain fatty acids can also be used for this purpose. These lower molecular weight oils are not ordinarily used in frying because of their low volatility and flash points. Polyol polyesters of fatty acids can also be used, as can synthetic triglycerides. These include low calorie and nonabsorbable fats such as sucrose polyesters. See for example, Mattson et al U.S. Pat. No. 3,600,186 and Jandacek U.S. Pat. No. 4,005,195 which describe these fats.

D. Cooking the Snack Pieces

Figure 2:
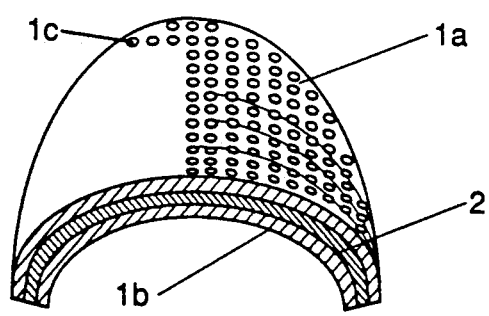
FIG. 2 shows a side view of the mold containing the dough.

The snacks are constrained during cooking. An apparatus as described in U.S. Pat. No. 3,626,466 (Liepa, 1971) can be used. The dough pieces are shaped using a movable, apertured mold half (as depicted in FIG. 1) to shape the cut dough pieces and then held during subsequent cooking by a second apertured mold half. (See FIG. 2.) It is important that the molds contain holes or apertures. These holes, along with the oil coating on the mold or the snack piece, control the water release during cooking and moderate the rate of evaporation. The structure developed in the cooked snack when there is a thin oil coating is very different than that without the oil coating. The exact number of holes and their size depends on the size, thickness and shape of the snack piece. Usually from 25% to 50%, and preferably from 35% to 45% of the mold surface area is holes about ⅛ inch (0.3 cm) in diameter.

Preferably, the mold is preheated to a temperature of between 300° F. (148° C.) to about 420° F. (215° C.). This is most easily accomplished by passing the mold through a heated oil bath and then draining it. This is sufficient to oil the molds and coat the snack pieces with the appropriate amount of oil and also to heat the mold.

The shaped, constrained pieces are passed through superheated steam or hot air or inert gas until they are cooked, i.e. they are crisp and crunchy with a final moisture content of about 0.5% to about 4% water. As used herein, the term "crunchy texture" refers to a snack that exhibits a crisp and crunching sensation for the first of several chews.

If desired, the snack pieces can be cooked to moisture contents of 10% or less with superheated steam and then heated with inert gas, or superheated steam to lower the moisture level to 4% or less. Inert gases include nitrogen, carbon dioxide and helium. This is a combined cooking/baking step. An alternative to the second baking step is the use of microwave or radiant heating to reduce the final moisture content to the 0.5 to 4% range.

The snack pieces are cooked at temperatures between about 300° F. (148° C.) and 450° F. (232° C.). The exact time is controlled by the temperature of the hot air or steam and the starting water content. The cooking time and temperature is easily determined by one skilled in the art.

Figure 3:
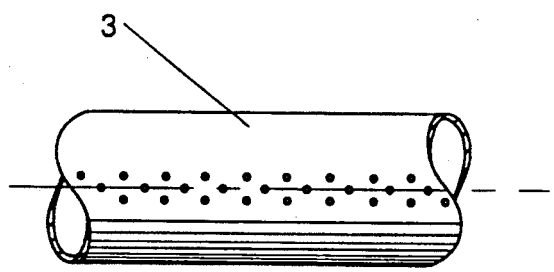
FIG. 3 is a pipe showing the steam outlets.
Figure 5:
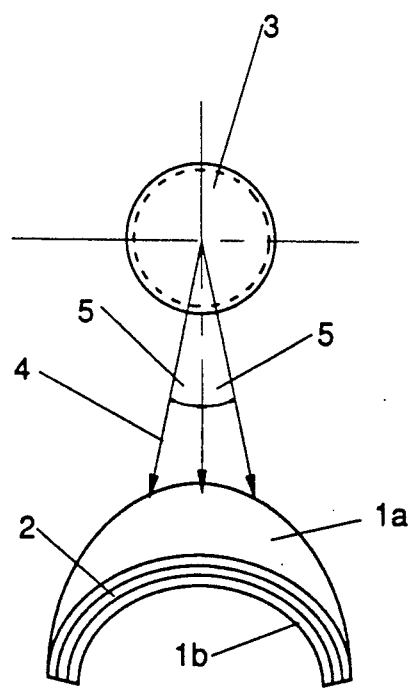
FIG. 5 shows an end view.
Figure 4:
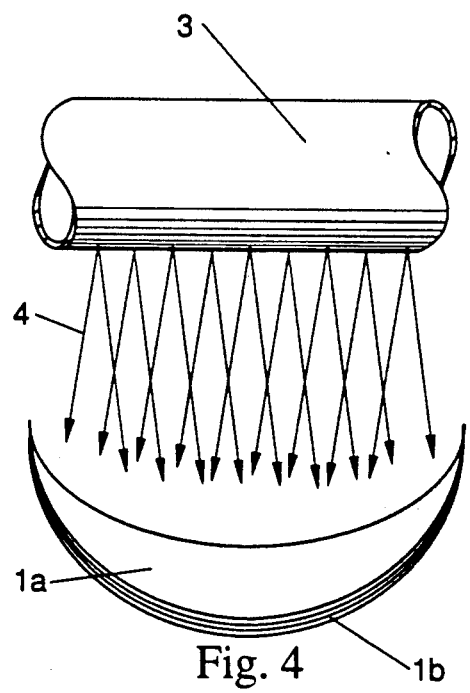
FIG. 4 shows a front view of the steam impinging on the mold.

The constraining, apertured molds are passed under steam or hot inert gas vents at a distance of from about 1.25 cm to 10 centimeters (½–4 inches). (See FIGS. 3, 4 and 5). While it is not possible to calculate the exact velocity with which the steam or inert gas impels the mold containing the dough pieces, in general it has been found that when steam is passed through a pipe at pressures of from about 3 to 20 pounds per square inch, said pipe having holes of from about 1/32" to ¼1 diameter, an adequate hot gas or steam supply is directed onto the pieces for cooking. The velocity of the steam cannot be measured directly, but it approaches a high level. The velocity of the steam tapers off as the product gets farther from the hole.

A preferred arrangement has three rows of holes in the pipe. The rows are spaced at 10-25 degree angles as measured from the center of the pipe. That is, as to a vertical plane in the center of the pipe, the holes are alternately 10°-25° on both sides of the center plane. The holes are from about ⅜ to 9/16 inches apart (0.9 to 1.4 cm), preferably 7/16 to 9/16 inches (1.09 to 1.4 cm) apart. The rows are staggered with respect to each other (see FIG. 3). Other arrangements for the vent holes in the pipe include a linear arrangement. Spray nozzles can be used to control the steam spray instead of the pipe system.

While not wishing to be bound by theory, it is believed that the hot steam or air at a temperature of from 350° F. (177° C.) to 450° F. (232° C.) heats the molds which then transfers the heat to the dough piece. Therefore, it is essential that the mold pieces which are used to constrain the dough be of a heat conductive material. Stainless or carbon steel work well.

The thin oil film allows the product to cook or bake faster and is necessary for giving the fried texture to the product. The oil improves the heat transfer probably through improved conduction, while serving as a moisture barrier. It also provides more uniform moisture distribution and expansion of the product. The dough is cooked twice as fast with the oil present than without the oil coating present.

In addition to the steam, infrared heating can be used as well as magnetic induction and hot air heating for cooking of the dough. When magnetic induction heating is used, the molds should be made of carbon steel or other magnetic responsive material.

The snack products made from this process typically have from about 10% to about 25% fat. Preferably, the cooked snacks will have from about 15% to about 20% fat content (dry weight basis).

To further improve the lubricity of the snack, oil can be sprayed onto the snack product when it emerges from the fryer, or when it is removed from the mold used in constrained cooking. Oils with characteristic flavors or highly unsaturated oils can be sprayed on the snack product. Oils such as olive oil, avocado oil, safflower oil, sesame oil, walnut oil, rice oil, rice bran oil or peanut oils can be used. In addition, oils with added flavors can be used. These include butter flavored oils, natural or artificial flavored oils, herb oils and oils with garlic or onion flavors added. This is a way to introduce a variety of flavors without having the flavor undergo browning reactions during the cooking. It also avoids adding a flavor to the dough. This method can be used to introduce healthier oils which would ordinarily undergo polymerization or oxidation on heating.

Oil spray can be used to increase the oil content from the 10% to 25% fat content as the snack product emerges from the cooking step to as high as 35% oil. Thus a snack product having from 20% to 35% fat can be made using this additional step.

While this invention has been illustrated using potato flour and starches, the process is equally applicable to other farinaceous products, e.g. wheat, yellow and white corn, rye, barley, rice and mixtures thereof.

SPECIFIC EXAMPLES OF PROCESS OF PRESENT INVENTION

The process of the present invention is illustrated by the following specific examples:

EXAMPLE 1

A mix consisting of approximately 58.6% potato flour, 40.4% water and 1.0% Duex® emulsifier (a mixture of mono-, di-, and triglycerides available from Procter & Gamble, Cincinnati, Ohio) is prepared by mixing the ingredients for two minutes in a single speed domestic food processor, forming a loose, dry dough. The dough is sheeted by feeding the dough through a pair of commercial 8" mill rolls forming a smooth elastic sheet controlled to a thickness of about 0.020 inches (0.05 cm). The dough sheet is then cut into oval shaped pieces.

A constrained cooking mold consisting of 6 pairs of perforated stainless steel halves is preheated in cottonseed oil at 375° F. (190° C.) for a time sufficient to raise the mold temperature to about that of the oil (within 5° F.). The molds are then removed from the oil and drained for 30 seconds in a hot atmosphere of superheated steam, air, or inert gas held at 375° F. (190° C.) so as not to cool the mold during draining. The molds are then removed from the hot atmosphere and opened for the immediate placement of the pre-cut oval dough pieces. After loading with the dough piece, the molds are immediately closed and the fixture placed under superheated steam. The steps which take place out of the heated environment are performed in the shortest time possible to prevent loss of heat from the mold.

Figure 6:
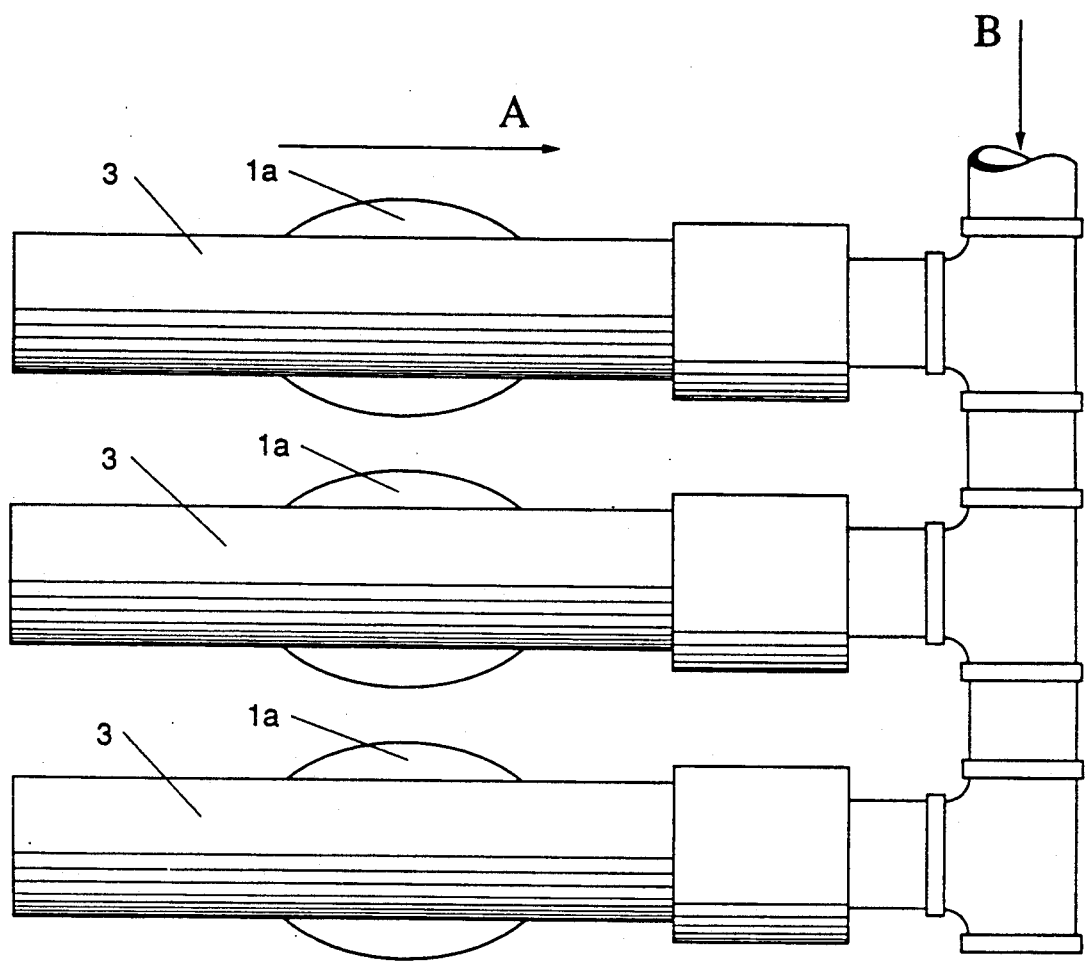
FIG. 6 demonstrates the nozzle and manifold arrangement of the preferred system.

Superheated steam is sprayed over the molds by nozzles constructed from schedule 10S stainless steel pipe. Each pipe is drilled with three rows of #55 holes (0.052 inches, 0.13 cm) running the length of the pipe. The rows are spaced 13° apart as measured from the center of the pipe. The pitch between the holes within a row is 7/16 inches (1.09 cm). The holes of the two outside rows are in line with each other but are staggered relative to the middle row. A pipe is centered above each of the six molds in the apparatus oriented with the middle row of holes pointing straight down and located such that the pipes are parallel to each other and in the same plane. The molds can be moved along the axis of the pipes providing an even spray of steam for the entire length of the pipes. This simulates a commercial scale device in which molds are held in a fixture and attached to a continuous chain under long lengths of parallel nozzles (pipes). (See FIG. 6 for an illustration of such an arrangement).

The steam pressure supplied to the nozzles is 10 psig; steam temperature in the pipe is 360° F. (182° C.). Exposure time under the steam is 14.5 seconds or sufficient to lower moisture to 2% or less without over-browning. The fat level of the finished product is 18%. The fat comes from a transference of oil from the mold to the chip.

The product has a light, crisp texture and flavor quite close to a deep fried version of the chip, the small differences originating from the two-fold difference in fat level.

EXAMPLE II

A product is made according to Example I except that the dough pieces are sprayed with oil instead of dipping the molds in oil. Similar results are achieved. In this case the molds are preheated with steam.

What is claimed is:

1. A process for making a low fat farinaceous snack having from about 10% to about 25% fat, comprising the steps of:
   (a) forming a dough comprising:
      (1) from about 50% to about 80% of a source of starch based flour;
      (2) from 0% to about 5% emulsifier;
      (3) from about 20% to about 50% added water;
   (b) forming the dough into a thin snack piece;
   (c) coating said snack pieces with about 10% to about 25% oil; and
   (d) cooking said snack pieces in an apertured heat conductive mold to a moisture content of from about 4% to about 10% using superheated steam at a temperature of from about 300° F. (148° C.) to about 450° F. (232° C.).

2. A process according to claim 1 wherein said snack pieces are formed by extrusion.

3. A process according to claim 1 wherein said mold is perforated and made of carbon or stainless steel.

4. A process according to claim 3 wherein said mold is preheated by immersion in vegetable oil at a temperature of from 300° F. (148° C.) to 425° F. (218° C.).

5. A process according to claim 3 wherein said steam is passed over the constrained snack pieces from a pipe at a pressure of from about 3 to about 20 pounds per square inch, said pipe having holes 1/32 to ⅛ in diameter at a 10 to 25 degree angle from the center plane of said pipe.

6. A process according to claim 5 wherein said superheated steam is at a temperature of from 325° F. (162° C.) to 450° F. (232° C.).

7. A process according to claim 6 wherein said snack piece is coated with oil by coating a mold with oil and constraining said snack piece in said mold.

8. A process according to claim 7 wherein said oil is selected from the group consisting of vegetable oils and partially hydrogenated vegetable oils.

9. A process of claim 8 wherein the dough is formed into a sheet having a thickness of from about 0.015 to about 0.035 inches (from about 0.038 cm to about 0.088 cm) and said snack piece is cut from said sheet.

10. A process of claim 7 wherein said dough additionally comprises from about 0.5% to about 12% sugar selected from the group of sucrose, glucose, fructose, maltodextrins and mixtures thereof.

11. A process of claim 9 wherein said flour is potato flour selected from the group consisting of potato flakes, potato granules and mixtures thereof.

12. A process of claim 11 wherein said dough contains from 0.5% to about 3% emulsifier.

13. The process of claim 12 wherein said emulsifier is a mixture of mono- and diglycerides of saturated and unsaturated fatty acids.

14. The process of claim 13 wherein the dough comprises at least about 25% added water.

15. The process of claim 13 wherein the dough comprises from about 55% to about 80% flour.

16. The process of claim 10 wherein the dough comprises from about 3% to about 15% maltodextrin, having a D.E. of from 10 to 20.

17. The process of claim 16 wherein the dough sheet is cut into an oval shaped dough pieces.

18. The process of claim 8 wherein said oil selected from the group consisting of hydrogenated or unhydrogenated cottonseed oil, soybean oil, corn oil, tallow, olive oil, canola oil, rapeseed oil, peanut oil and mixtures thereof.

19. A process according to claim 16 comprising the additional step of spraying from about 1% to about 10% spray oil on the cooked snack product.

20. A process according to claim 19 wherein said spray oil is selected from the group consisting of olive oil, avocado oil, safflower oil, sesame oil, walnut oil, peanut oil, cottonseed oil, soybean oil, sunflower oil, canola oil, rice bran oil, flavored oils and mixtures thereof.

21. A process according to claim 8 wherein said snack pieces are formed by extrusion.

22. A process according to claim 5 wherein said snack pieces are coated with from 10% to 20% oil and then placed in a preheated mold.

23. A process according to claim 22 wherein said flour is selected from the group consisting of potato flour, corn flour, wheat flour, rye flour and mixtures thereof.

24. A process according to claim 5 wherein said snack pieces are cooked to a moisture content of about 8% to about 10% and then heated by microwave or radiant heat to bring the moisture to about 2% to about 4%.

25. A process for making a low fat farinaceous snack having from about 10% to about 25% fat, comprising the steps of:
    (a) forming a dough comprising:
        (1) from about 50% to about 80% of a source of starch based flour;
        (2) from 0% to about 5% emulsifier;
        (3) from about 20% to about 50% added water;
    (b) forming the dough into a thin snack piece;
    (c) coating said snack pieces with about 10% to about 25% oil; and
    (d) cooking said snack pieces in an apertured heat conductive mold to a moisture content of from about 4% to about 10% at a temperature of from about 300° F. (148° C.) to about 450° F. (232° C.), by using magnetic induction.

26. A process according to claim 25 wherein said molds are made from carbon steel.

* * * * *